(12) United States Patent
Engelmann et al.

(10) Patent No.: US 11,746,482 B2
(45) Date of Patent: Sep. 5, 2023

(54) INCLINATION CONTROL FOR CONSTRUCTION MACHINES

(71) Applicants: Caterpillar Paving Products Inc., Brooklyn Park, MN (US); Caterpillar Trimble Control Technologies LLC, Dayton, OH (US)

(72) Inventors: Eric S. Engelmann, Delano, MN (US); Mark A. Tarvin, Canton, IL (US); Conwell K. Rife, Jr., Wayzata, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/239,468

(22) Filed: Apr. 23, 2021

(65) Prior Publication Data
US 2021/0238814 A1 Aug. 5, 2021

Related U.S. Application Data

(63) Continuation-in-part of application No. 16/654,994, filed on Oct. 16, 2019, now Pat. No. 11,105,051.
(Continued)

(51) Int. Cl.
*E01C 23/088* (2006.01)
*B62D 55/065* (2006.01)
(Continued)

(52) U.S. Cl.
CPC .......... *E01C 23/088* (2013.01); *B62D 55/065* (2013.01); *B62D 55/084* (2013.01); *E01C 23/127* (2013.01)

(58) Field of Classification Search
CPC .... E01C 23/088; E01C 23/093; E01C 23/127; B62D 55/116
See application file for complete search history.

(56) References Cited

U.S. PATENT DOCUMENTS 3,423,859 A 1/1969 Swisher, Jr.
4,041,623 A 8/1977 Miller
(Continued)

FOREIGN PATENT DOCUMENTS

EP 2104768 B1 2/2013
JP 2007009540 A 1/2007

OTHER PUBLICATIONS

"U.S. Appl. No. 16/654,994, Non Final Office Action dated Oct. 26, 2020", 11 pgs.
(Continued)

*Primary Examiner* — Janine M Kreck
(74) *Attorney, Agent, or Firm* — Schwegman, Lundberg & Woessner

(57) ABSTRACT

A system may include a first transportation device of a milling machine, a controller, and an inclination control system. The controller can control a construction machine including the first transportation device, which can move the construction machine over an operating surface. The inclination control system includes a first sensor coupled to the first transportation device to sense an orientation of the first transportation device relative to the frame of the milling machine. The controller controls the milling machine based on inclination information received from the inclination control system.

14 Claims, 6 Drawing Sheets

Related U.S. Application Data

(60) Provisional application No. 62/749,571, filed on Oct. 23, 2018.

(51) Int. Cl.
   *B62D 55/084* (2006.01)
   *E01C 23/12* (2006.01)

(56) References Cited

U.S. PATENT DOCUMENTS

| | | | |
|---|---|---|---|
| 4,139,318 A | 2/1979 | Jakob | |
| 4,140,420 A | 2/1979 | Swisher, Jr. | |
| 4,195,946 A | 4/1980 | Swisher, Jr. | |
| 4,270,801 A | 6/1981 | Swisher, Jr. | |
| 4,325,580 A | 4/1982 | Swisher, Jr. | |
| 5,309,407 A | 5/1994 | Sehr | |
| 5,315,770 A | 5/1994 | Campbell | |
| 5,607,205 A | 3/1997 | Burdick | |
| 5,906,655 A | 5/1999 | Fan | |
| 5,984,420 A | 11/1999 | Murray | |
| 6,916,070 B2 | 7/2005 | Sehr | |
| 7,510,347 B2 * | 3/2009 | Lemke | E01C 23/088 299/1.5 |
| 7,523,995 B2 | 4/2009 | Rio | |
| 8,113,592 B2 | 2/2012 | Busley | |
| 8,424,972 B2 * | 4/2013 | Berning | E01C 23/088 299/1.5 |
| 9,656,530 B2 | 5/2017 | Busley et al. | |
| 9,879,390 B2 | 1/2018 | Berning et al. | |
| 9,956,842 B2 | 5/2018 | Muir et al. | |
| 10,011,974 B2 | 7/2018 | Zhang et al. | |
| 2002/0047301 A1 | 4/2002 | Davis | |
| 2005/0207841 A1 | 9/2005 | Holl | |
| 2008/0263908 A1 * | 10/2008 | Schoenmaker | E02F 3/434 711/100 |
| 2009/0103978 A1 | 4/2009 | Walker | |
| 2012/0301220 A1 | 11/2012 | Snoeck et al. | |
| 2014/0110990 A1 | 4/2014 | Berning | |
| 2014/0324291 A1 | 10/2014 | Jones et al. | |
| 2015/0132059 A1 * | 5/2015 | Johnson | E01C 3/06 404/94 |
| 2016/0265356 A1 | 9/2016 | Müller | |
| 2017/0313303 A1 | 11/2017 | Valtanen | |
| 2018/0163364 A1 * | 6/2018 | Huissoon | E02F 9/003 |
| 2020/0079443 A1 | 3/2020 | Sauvageau et al. | |

OTHER PUBLICATIONS

"Machine translation of EP0547378 dated Oct. 2020".
"U.S. Appl. No. 16/654,994, Response filed Mar. 22, 2021 to Non Final Office Action dated Oct. 26, 2020", 15 pgs.
Chinese Search Report for China Patent Appln. No. 201980069546.3, dated Mar. 25, 2022 (2 pgs).

* cited by examiner

INCLINATION CONTROL FOR CONSTRUCTION MACHINES

CLAIM OF PRIORITY

This application is a Continuation-in-Part of U.S. application Ser. No. 16/654,994, filed Oct. 16, 2019, which application claims the benefit of priority to U.S. Provisional Application Ser. No. 62/749,571, filed on Oct. 23, 2018, each of which is incorporated herein by reference in its entirety.

TECHNICAL FIELD

The present disclosure generally relates to the field of construction. More particularly, the present disclosure relates to systems and methods of inclination control for construction machines.

BACKGROUND

Cold planer machines and rotary mixer machines can be used to remove old or degraded pavement from surfaces such as roadways and parking lots. These and other construction machines can traverse uneven terrain causing tilting of the construction machine which can affect performance.

U.S. Pat. No. 9,879,390 to Berning et al., entitled "Road Milling Machine and Method for Measuring the Milling Depth," discloses a method for "measuring the milling depth of a road milling machine."

SUMMARY OF THE INVENTION

To summarize at least a portion of the disclosure, a non-limiting list of examples is provided here:

In one aspect, the present disclosure relates to a system including a first transportation device, a controller, and an inclination control system. The first transportation device may move a construction machine over an operating surface. The controller may control the construction machine including the first transportation device. The inclination control system includes a first slope sensor coupled to the first transportation device and a second slope sensor coupled to the construction machine. The controller may control the construction machine based on inclination information received from the inclination control system.

In another aspect, the present disclosure relates to a method of controlling inclination of a construction machine. The method includes collecting at a first slope sensor, position or orientation information related to a first transportation device of a construction machine. The method further includes collecting, at a second slope sensor, position or orientation information related to a portion of the construction machine. The method also includes determining an inclination measurement of the construction machine relative to an operating surface based on the position or orientation information from the first and second slope sensors. The method further includes extending or retracting a first lifting column based on the inclination measurement.

In another aspect, the present disclosure relates to a system including a first slope sensor, a second slope sensor, a plurality of transportation devices, and a controller. The first slope sensor is coupled to a construction machine at a first location. The second slope sensor is coupled to the construction machine at a second location. The controller may manipulate a first transportation device of the plurality of transportation devices based on a comparison of information received from the first and second slope sensors.

In another aspect, the present disclosure relates to a construction vehicle including a frame defining a front and rear of a milling machine and a milling drum carried by the frame. The milling drum is surrounded by a milling enclosure. The construction vehicle also includes a front left transportation device, a front right transportation device, and at least one rear transportation device, each of which is configured to move the milling machine over a ground surface. The construction vehicle also include a front left longitudinally adjustable lifting column, a front right longitudinally adjustable lifting column, and at least one rear left longitudinally adjustable lifting column, each of which extends between the frame and its corresponding transportation device. The construction vehicle also includes a controller that is configured to control movement of one or more of the lifting columns along its longitudinal axis to change a distance between the frame and one or more of the transportation devices. The construction vehicle also includes an inclination control system, which includes a first sensor associated with a first transportation device of the transportation devices, such that the first sensor is configured to detect an angle of the first transportation device relative to the frame. The controller is configured to determine, based on sensed information received from the first sensor, an inclination of the frame of the milling machine relative to the ground surface supporting the first transportation device, and control one or more of the lifting columns to change the inclination of the frame of the milling machine.

In another aspect the present disclosure relates to a system including a milling machine and an inclination control system. The milling machine includes a frame extending from a rear of the milling machine to a front of the milling machine, a milling drum supported by the frame and configured to cut hardened materials to create a milled surface, a plurality of transportation devices, and first and second rear lifting columns. The plurality of transportation devices is configured to transport the milling machine and includes first and second rear transportation devices. The first rear lifting column extends from the first rear transportation device and is configured to be extended or retracted to change an orientation of the first rear transportation device relative to the frame. The second rear lifting column extends from the second rear transportation device and is configured to be extended or retracted to change an orientation of the second rear transportation device relative to the frame. The inclination control system includes a first angle sensor, a second angle sensor, and a controller. The first angle sensor is coupled to the first rear transportation device and is configured to provide orientation information related to the first rear transportation device. The second angle sensor is coupled to the second rear transportation device and is configured to provide orientation information related to the second rear transportation device. The controller is configured to extend or retract the first and second rear lifting columns based on the orientation information received from the first and second angle sensors to achieve a predetermined orientation of the first and second rear transportation devices to maintain an orientation of the frame of the milling machine relative to a cut plane.

In another aspect, the present disclosure relates to a method of controlling inclination of a construction machine. The method includes collecting, at an inclination control system including a first angle sensor coupled to a first rear transportation device, a first angle of the first rear transportation device. The method further includes determining, at a controller of the inclination control system, that the first angle indicates that a frame of the milling machine is at an incorrect orientation relative to a cut plane. The method includes extending or retracting, via the controller, a lifting column of the first rear transportation device to change the first angle of the first rear transportation device to a second angle. The method further includes collecting at the inclination control system information about the second angle of the first rear transportation device. The method additionally includes determining, at the controller, that the second angle of the first rear transportation device indicates that the frame of the milling machine is at a correct orientation relative to the cut plane.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

The drawings illustrate generally, by way of example, but not by way of limitation, various embodiments discussed in the present document.

DETAILED DESCRIPTION

Figure 1:
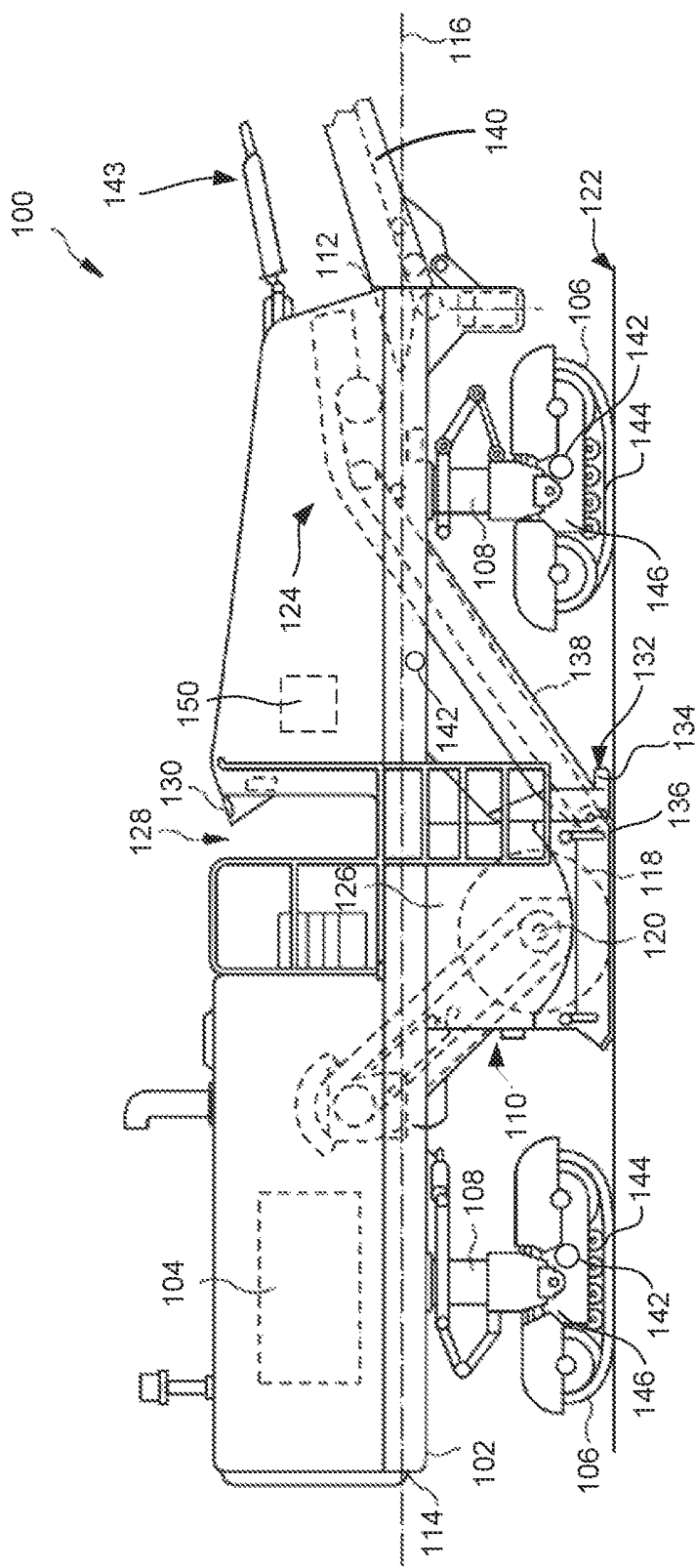
FIG. 1 is a side view of a construction machine including an inclination control system, in accordance with at least one example.

An inclination control system may include one or more slope sensors positioned on a construction machine to determine the inclination of the construction machine. The slope sensors may be positioned on the tracks of transportation devices of the construction machine, and in some examples, on the chassis or frame of the construction machine. The slope sensor on the track of the transportation device may indicate an angle or position of the track, which may be used to determine whether the frame of the construction machine is parallel to the operating surface. For example, one or more linear sensors may be coupled to a transportation device and its lifting column to indicate an angle between the transportation device and its lifting column. This angle can indicate an angle of the frame of the construction machine, and the inclination control system can extend or retract the lifting column to correct the angle between the lifting column and the transportation device, which will correct the inclination of frame of the construction machine. In at least one example, a linear sensor is used on each of the rear transportation devices to indicate the angle between the rear transportation devices and their lifting columns, and those angle values are averaged and compared to a threshold or desired angle value or range. For example, the threshold value could be 90 degrees, such that an angle value or an average angle value greater than or less than 90 degrees would indicate the need to adjust the lifting columns to return the angles or average angle to 90 degrees.

In some examples, one or more track sensors may be used with one or more slope sensors positioned on the frame of the construction machine to indicate the angle of the construction machine relative to the operating surface. The inclination control system allows a controller to maintain the frame of the construction machine parallel to the operating surface (or to a predetermined offset angle relative to the operating surface) by adjusting the lifting columns of the transportation devices based on the information received from the inclination control system.

For the purposes of this disclosure, a slope sensor means any sensor that can be used (alone or in combination with other slope sensors or information) to determine an orientation or angle of the frame of the construction machine relative to an operating surface, for example, sensors that measure slope, angle sensors, linear sensors (including magnetoresistive sensors, laser sensors, string potentiometers, etc.), rotary angle position sensors, inertial measurement units (IMUs), single axis sensors, multiple axis sensors, six degree of freedom (6DoF) sensors, optical sensors (including smart cameras, etc.), a combination of these or the like. The use of the inclination control system allows for more precise control of the construction machine to maintain the frame of the construction machine parallel to the operating surface (or at a predetermined offset).

FIG. 1 is a side view of a construction machine 100, which in the illustrated example is a cold planer machine. The cold planer machine 100 includes a frame 102 to which a power source 104 and transportation devices 106 can be connected. Transportation devices 106 can be connected to the frame 102 via lifting columns 108. In at least one example, the transportation devices 106 can include the lifting columns 108, such that controlling the transportation devices 106 can include controlling the lifting columns 108. A milling assembly 110 can, for example, be coupled to the underside of the frame 102 between the transportation devices 106.

The frame 102 longitudinally extends between a first (e.g., front) end 112 and a second (e.g., rear) end 114 along a frame axis 116. The power source 104 can be provided in any number of different forms including, but not limited to, Otto and Diesel cycle internal combustion engines, electric motors, hybrid engines and the like. Power from the power source 104 can be transmitted to various components and systems of machine 100, such as the transportation devices 106 and a milling drum 118.

The frame 102 can be supported by the transportation devices 106 via lifting columns 108. Each of the transportation devices 106 can be any kind of ground-engaging device that allows the cold planer machine 100 to move over a ground surface, for example a paved road or a ground already processed by the cold planer machine 100. In the illustrated example, the transportation devices 106 are configured as track assemblies, each of which includes a track 144 and a track frame 146 around which the track 144 rotates. The transportation devices 106 can be configured to move the cold planer machine 100 in forward and backward directions along the ground surface in the direction of the axis 116. The lifting columns 108 can be configured to raise and lower the frame 102 relative to the transportation devices 106 and the ground.

The milling assembly 110 can include the rotatable milling drum 118 operatively connected to the power source 104. The milling drum 118 can include a plurality of cutting tools, such as chisels, disposed thereon. The milling drum 118 can be rotated about a drum or housing axis 120 extending in a direction perpendicular to the frame axis 116 into the plane of FIG. 1. As the rotatable milling drum 118 spins or rotates about the drum axis 120, the cutting tools may engage hardened materials 122, such as, for example, asphalt and concrete, of existing roadways, bridges, parking lots and the like. Moreover, as the cutting tools engage such hardened materials 122, the cutting tools remove layers of these hardened materials 122. The spinning action of the rotatable drum 118 and its cutting tools can then transfer the hardened materials 122 to a conveyor system 124.

The milling assembly 110 can further include a drum housing 126 forming a chamber for accommodating the milling drum 118. The drum housing 126 can include front and rear walls, and a top cover positioned above the milling drum 118. Furthermore, the drum housing 126 can include lateral covers, or side plates, on the left and right sides of the milling drum 118 with respect to a travel direction of the cold planer machine 100. The drum housing 126 can be open toward the ground so that the milling drum 118 can engage the ground from the drum housing 126. Furthermore, the drum housing 126 can be removed from the frame 102 for maintenance, repair and transport.

The cold planer machine 100 can further include an operator station or platform 128 including an operator interface 130 for inputting commands to a controller 150 for controlling the cold planer machine 100, and for outputting information related to an operation of the cold planer machine 100. As such, an operator of the cold planer machine 100 can perform control and monitoring functions of the cold planer machine 100 from the platform 128, such as by observing various data output by sensors located on the cold planer machine 100. Furthermore, the operator interface 130 can include controls for operating the transportation devices 106 and the lifting columns 108.

An anti-slabbing system 132 can be coupled to the drum housing 126 and can include an upwardly oriented base plate (not visible in FIG. 1) extending across a front side of the cutting chamber, a forwardly projecting plow 134 for pushing loose material lying upon the hardened materials 122, and a plurality of skids 136. The conveyor system 124 can include a primary conveyor 138 and a secondary conveyor 140. The primary conveyor 138 can be positioned forward of the milling drum 118 and can be coupled to and supported upon the base plate of the anti-slabbing system 132. The primary conveyor 138 can feed material cut from the hardened materials 122 via the milling drum 118 to the secondary conveyor 140 projecting forward of the frame end 112. A positioning mechanism 143 can be coupled to the secondary conveyor 140, to enable left, right, up and down position control of the secondary conveyor 140. The secondary conveyor 140 can deposit removed hardened materials 122 into a receptacle, such as the box of a dump truck.

The cold planer machine 100 can include further components not shown in the drawings, which are not described in further detail herein. For example, the cold planer machine 100 can further include a fuel tank, a cooling system, a milling fluid spray system, various kinds of circuitry, etc. Additionally, although the present application is described with reference to a cold planer machine including a milling drum, the present invention is applicable to other types of construction machines.

The cold planer machine 100 can drive over the hardened materials 122 such that the front transportation devices 106 roll over the hardened materials 122. The cold planer machine 100 can be configured to remove the hardened materials 122 from a roadway to leave a planed surface behind. In some examples, the rear transportation devices 106 can roll on the planed surface, with the milling assembly 110 producing an edge of the hardened material 122 between milled and un-milled surfaces of the hardened material 122. The milled surface can include a surface from which paving material has been completely removed or a surface of paving material from which an upper-most layer of paving material has been removed, or a surface comprising material mixed by the milling assembly 110.

The cold planer machine 100 can be configured to travel in a forward direction (from left to right with reference to FIG. 1) to remove the hardened materials 122. The anti-slabbing system 132 can travel over the top of the hardened materials 122 to prevent or inhibit the hardened materials 122 from becoming prematurely dislodged during operations for removal of the hardened materials 122. The milling drum 118 can follow behind the anti-slabbing system 132 to engage the hardened materials 122. The milling drum 118 can be configured to rotate counter-clockwise with reference to FIG. 1 such that material of the hardened materials 122 can be uplifted and broken up into small pieces by cutting teeth or chisels of the milling drum 118. The anti-slabbing system 132 can be configured to contain pieces of the hardened materials 122 within the drum housing 126. Removed pieces of the hardened materials 122 can be pushed up the primary conveyor 138 and carried forward, such as by an endless belt, to the secondary conveyor 140. The secondary conveyor 140 can be cantilevered forward of the front frame end 112 to be positioned over a collection vessel, such as the box of a dump truck. While the illustrated example is described with reference to an up cutting machine, the present teachings are applicable to a down cutting machine as well.

During the course of moving over the hardened materials 122, the transportation devices 106 can encounter obstacles, protrusions, or slopes which are rolled over by the transportation devices 106. Such obstacles, protrusions, or slopes can cause the cold planer machine 100 to tilt in one or more directions. In at least one example, the construction machine 100 can include an inclination control system to determine inclination of the construction machine 100 such that the controller 150 can control the construction machine 100 to compensate for the inclination.

The inclination control system includes a plurality of slope sensors 142 coupled to the constructions machine 100 to gather information related to forward-aftward tilting (pitch), side-to-side tilting (roll), or both, of the construction machine 100. In some examples, one or more of the plurality of slope sensors 142 can be positioned on one or more of the transportation devices 106, for example on the track frame 146 to gather information related to the position or orientation of the transportation device 106. In some examples, one or more of the plurality of slope sensors 142 can be positioned on the frame 102 or another portion of the construction machine 100 to gather information about the position or orientation of the construction machine 100. In some examples, information from each of two or more slope sensors 142 can be compared to determine an orientation of the construction machine 100. In at least one example, one or more slope sensors 142 positioned on a transportation device 106 is used in conjunction with one or more slope sensors 142 positioned on the frame 102 of the construction machine 100, such that the information from these sensors can be compared to determine a position or orientation of the construction machine 100 relative to the cut plane (the operating surface), and to use this information to adjust the construction machine 100 to maintain the frame 102 of the machine parallel to the cut plane. In at least one example, the controller 150 adjusts the construction machine 100 to maintain the frame 102 parallel to the track of the transportation device 146. In some examples, the operator may choose to operate the construction machine 100 at an incline or a decline, in which case the inclination control system can be used to maintain the frame 102 of the construction machine 100 at a predetermined offset from parallel to the operating surface. In at least one example, the inclination control system only requires one sensor (rather than a plurality) positioned on a single transportation device to control inclination of the construction machine 100.

The controller 150 can use information from the plurality of sensors 142 in conjunction with other machine information, for example steering data, to control tilting or inclination of the cold planar machine 100 relative to the operating surface. In at least one example, the plurality of sensors 142 can be used to control the cut plane of the milling drum 118 by controlling the orientation of the milling drum 118. In at least one example, the plurality of sensors 142 can be used to keep the cold planer machine 100 level for cutting. In at least one example, the controller 150 uses the inclination information (based on the slope sensors) to adjust (e.g., extend or retract) one or more of the lifting columns 108. In at least one example, the inclination control system including the plurality of sensors 142 can be used to control the stability of the construction machine 100 when moving over a bump or other obstacle or when moving between surfaces of different heights.

Figure 2:
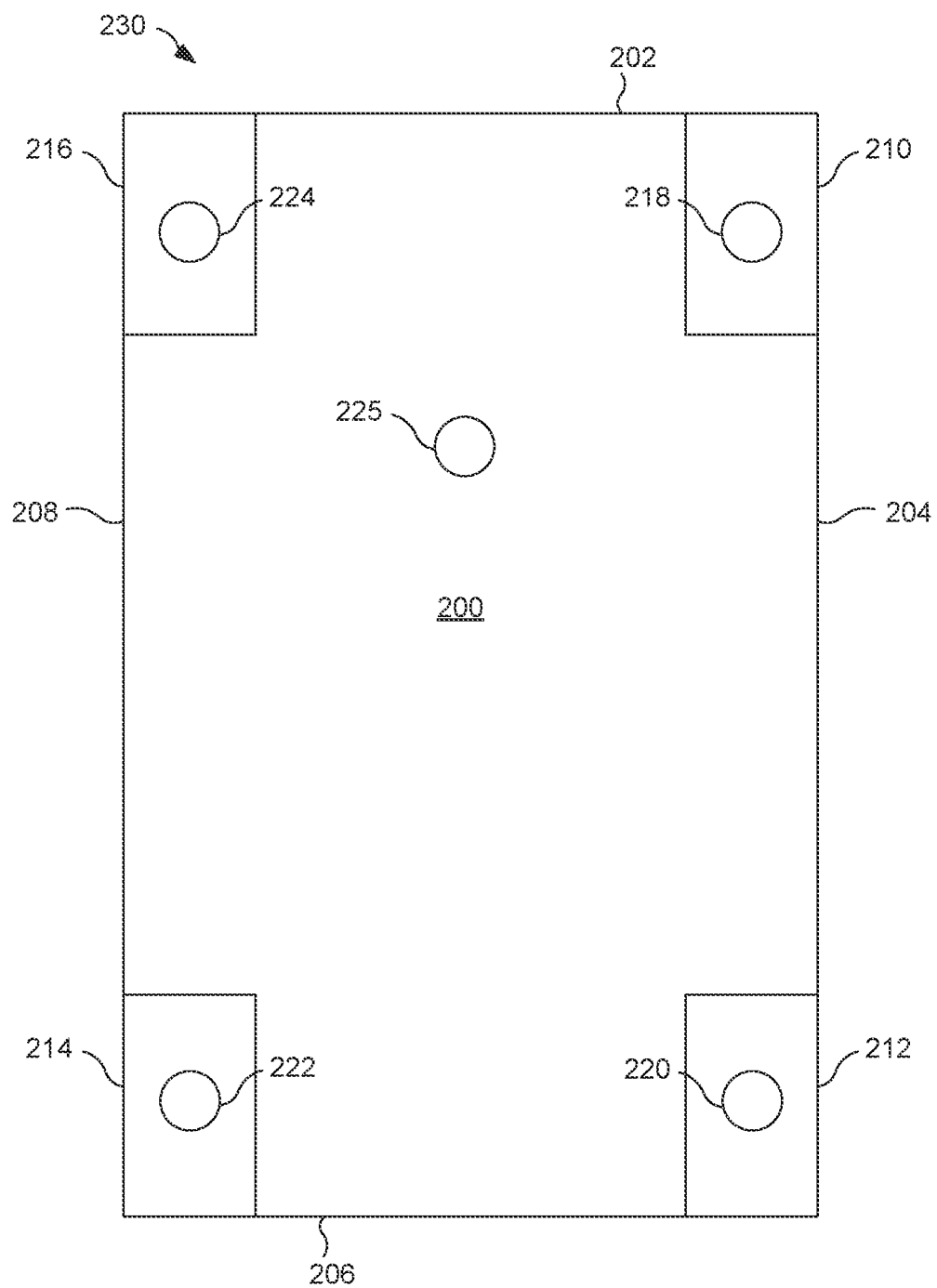
FIG. 2 is a diagrammatic plan view of a construction machine including an inclination control system, in accordance with at least one example.

FIG. 2 is a diagrammatic plan view of a construction machine 200 including an inclination control system 230, in accordance with at least one example. The construction machine 200 includes a front end 202, a right side 204, a rear end 206, and a left side 208. The construction machine 200 further includes a right front transportation device 210, a right rear transportation device 212, a left rear transportation device 214, and a left front transportation device 216. The inclination control system 230 includes a plurality of slope sensors 218, 220, 222, 224, 225 coupled to the construction machine 200. In the illustrated example, a plurality of slope sensors 218, 220, 222, 224 are shown positioned on the transportation devices 210, 212, 214, 216. However, the inclination control system 230 can include more or less slope sensors than those shown.

In some examples, the inclination control system 230 can include multiple slope sensors 218, 220, 222, 224, 225 per transportation device 210, 212, 214, 216 or other portion of the construction machine 200 (e.g., the frame). In at least one example, one or more of the slope sensors 218, 220, 222, 224, 225 is a single axis sensor. In at least one example, the inclination control system 230 does not require two slope sensors on each side. In at least one example, the inclination control system 230 only requires one of the slope sensors 218, 224 at the front end 202 of the construction machine 200, and one of the slope sensors 220, 222 at the rear end 206 of the construction machine 200. In another example, the inclination control system 230 only requires one of the slope sensors 222, 224 on the left side 208 and one of the slope sensors 210, 212 on the right side 204. In at least one example, the inclination control system 230 only includes slope sensors on the front transportation devices 210, 216. In another example, the inclination control system 230 only includes slope sensors on the rear transportation devices 212, 214. In another example, the inclination control system 230 only includes slope sensors on the right side transportation devices 210, 212. In another example, the inclination control system 230 only includes slope sensors on the left side transportation devices 214, 216. In at least one example the inclination control system 230 only includes a single slope sensor positioned on a single transportation device. In any of these examples, one or more slope sensors 225 may be positioned on the construction machine 200 other than on a transportation device 210, 212, 214, 216, for example on a frame or chassis of the construction machine 200.

In some examples the inclination control system 230 only detects and corrects for side-to-side tilt or roll. In some examples, the inclination control system 230 only detects and corrects for forward-aftward tilt or pitch. In some examples, the inclination control system 230 detects and corrects forward-aftward tilt (pitch) and side-to-side tilt (roll). In some examples, the inclination control system 230 detects and corrects for any deviation from parallel to the cut plane. For example, if the frame of the construction machine 200 is not parallel to the cut plane, the inclination control system 230 will detect this and correct the construction machine such that the frame is parallel to the cut plane. In at least one example, the inclination control system 230 uses geographical data of the operating surface to keep the frame parallel to the cut plane. In at least one example, the inclination control system 230 detects and corrects in real time. For example, the inclination control system 230 can detect and control the orientation of the construction machine 200 relative to the cut plane to provide the desired cut, to provide an even cut, to provide a smooth ride for the operator, to avoid tipping of the machine, to avoid other unfavorable operational conditions of the construction machine 200, a combination of these, or the like.

In at least one example, one or more of the slope sensors is a dual-axis sensor. In some examples, one or more of the slope sensors is a six degree of freedom (6DoF) sensor capable of measuring heave, sway, surge, roll, yaw, and pitch. In some examples, one or more of the slope sensors may include an accelerometer, a gyroscope, a magnetometer, a combination of these, or the like. In some examples, one or more of the slope sensors is a single axis sensor. In some examples, one or more of the sensors is an angle sensor or a linear sensor. In at least one example, at least two of the slope sensors are 6DoF sensors, bile a slope sensor on the machine frame is not.

Figure 3:
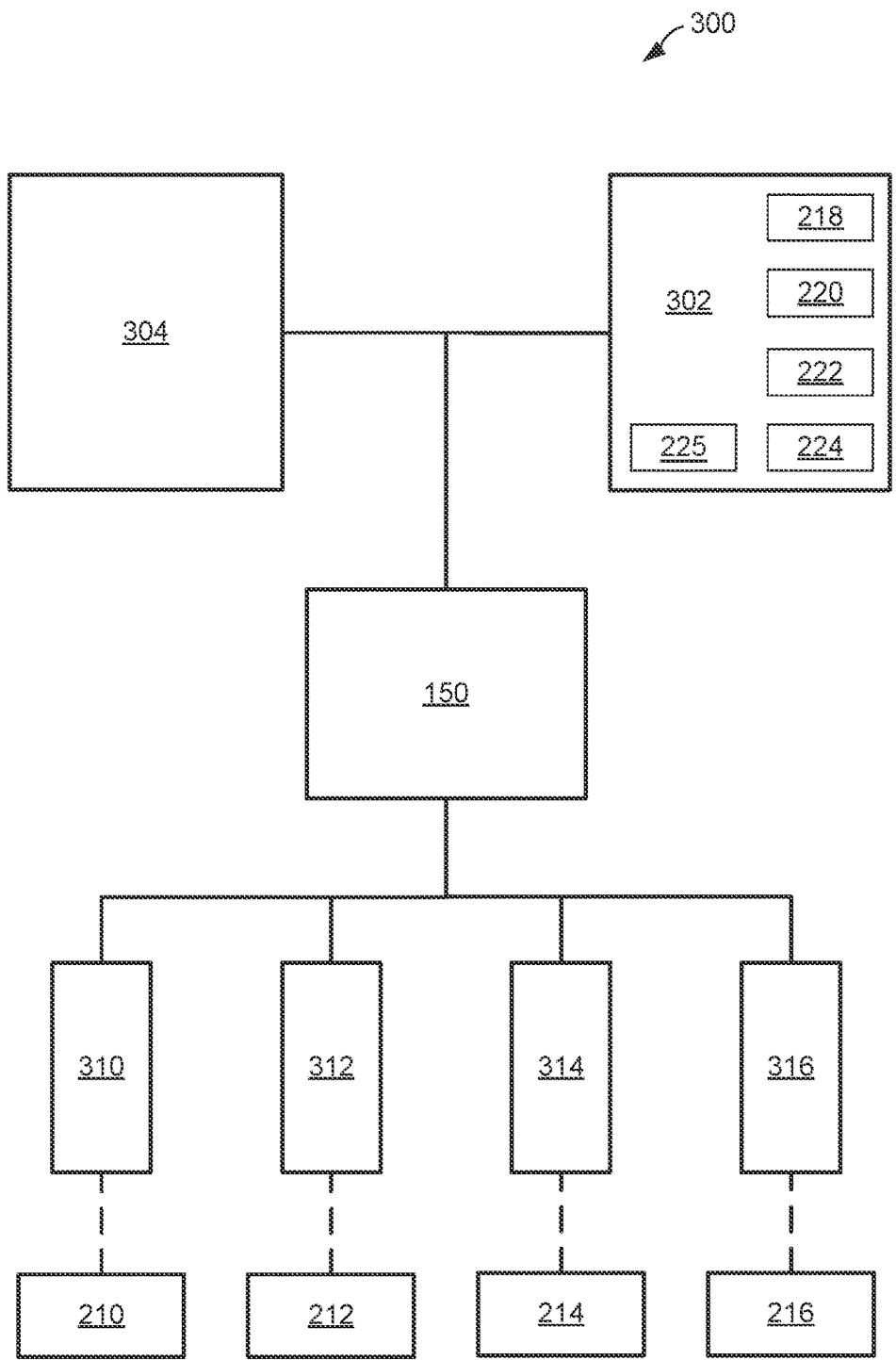
FIG. 3 is a schematic of a construction machine including an inclination control system, in accordance with at least one example.

FIG. 3 is a schematic of a construction machine 300 including an inclination control system 302, in accordance with at least one example. The inclination control system 302 includes the plurality of slope sensors 218, 220, 222, 224, 225. In at least one example, the controller 150 uses information received from the inclination control system 302 along with other machine information 304 to determine an inclination or tilt of the construction machine 300 (an inclination measurement). Machine information 304 can include, for example, steering data, machine specifications, threshold tilt values, worksite information, operating surface information, machine direction, machine speed, etc.

Based on the inclination measurement determined by the controller 150, the controller 150 adjusts (extends or retracts) one or more of the lifting columns 310, 312, 314, 316. Since each lifting column 310, 312, 314, 316 corresponds to a transportation device 210, 212, 214, 216 the controller 150 can identify and select the one or more lifting columns 310, 312, 314, 316 that need to be adjusted to correct the inclination or tilt of the construction machine 300. For example, if the inclination control system 302 indicates that the construction machine 300 is not parallel to the cut surface due to a side-to-side tilt such that the right side 204 is lower than the left side 208, the controller 150 can extend the right side lifting columns 310, 312 (corresponding to right side transportation devices 210, 212) to raise the right side 204 relative to the left side 208, or the controller 150 can retract the left side lifting columns 314, 316 (corresponding to left side traveling deices 214, 216) to lower the left side 208 relative to the right side 204.

Similarly, if the inclination control system 302 indicates that the construction machine 300 is not parallel to the cut surface due to a forward-aftward tilt such that the rear end 206 is higher than the front end 202, the controller 150 can extend the front end lifting columns 310, 316 (corresponding to front end transportation devices 210, 216) to raise the front end 202 relative to the rear end 206, or the controller 150 can retract the rear end lifting columns 312, 314 (corresponding to rear end transportation devices 212, 214) to lower the rear end 206 relative to the front end 202. In some examples, the inclination control system 302 may indicate tilts or inclinations in both the fore-aft and side-to-side directions. In at least one example, the inclination control system only corrects for forward-aftward tilt.

Figure 4:
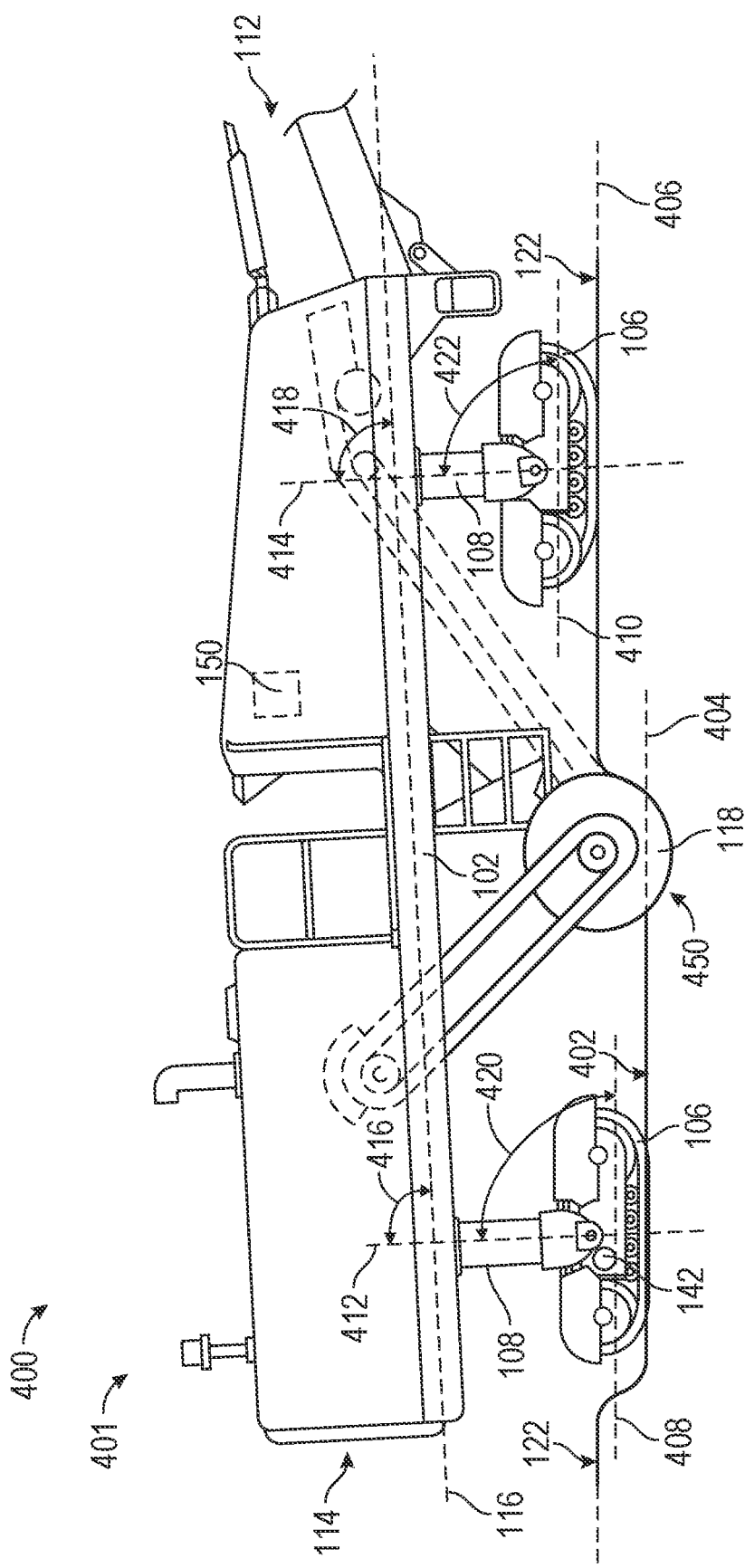
FIG. 4 is a side view of a construction machine before the inclination control system has been used to correct inclination, in accordance with at least one example.

FIG. 4 is a side view of a construction machine 400 before the inclination control system 401 has been used to correct inclination of the frame 102, in accordance with at least one example. In the illustrated example, the construction machine 400 is a milling machine, for example a cold planer. The front and rear transportation devices 106 began on the ground surface or hardened material 122 and began milling by plunging the milling drum 118 into the hardened material 122 to create an operating surface 402. The transportation devices 106 move or transport the milling machine 400 over the ground surface. Immediately after the plunge, the front and rear transportation devices 106 remain on the hardened material 122 straddling the operating surface 402. As the milling machine 400 advances, the front transportation devices 106 continue moving on the hardened material 122, while the rear transportation devices 106 drop into the depression created by the milling drum. This depression can be seen in the difference between the operating surface 402 and the plane 406 of the hardened material 122. In the illustrated example the rear transportation devices 106 are positioned on the operating surface 402 in a depression relative to the front transportation devices 106, which are positioned on the hardened material 122 that has not yet been milled by the milling drum 118. As a result, the rear portion of the milling machine 400 is lower relative to the front portion of the milling machine 400, such that the front portion of the milling machine 400 is pitched up (nose-up) and the frame axis 116 is at an incorrect orientation relative to the operating surface 402 and the corresponding cut plane 404. The incorrect orientation is generally an orientation such that the frame 102 is at an angle relative to (non-parallel) to the cut plane 404. However, in some examples in which an offset angle is desired for milling, an incorrect orientation is an orientation other than the offset of parallel to the cut plane 404 (or a predetermined deviation therefrom). In the illustrated example, this has resulted in the milling drum 118 deviating from the cut plane 404 to gouge 450 or otherwise cut deeper than the desired depth and create an uneven surface. In conventional systems, the milling machine might include automatic controls that raise the lifting columns 108 of the front transportation device 106 so as to avoid a gouge 450 and to maintain the milling drum 118 cutting along the cut plane 402. However, such automatic adjustments result in an even more significant nose-up pitch of the frame 102 and can reduce the available range of adjustment of the lifting columns 108 of the front transportation devices 106 (i.e., they may not be able to extend further when necessary, limiting their ability to be adjusted to control the milling drum 118 or for other reasons). This extreme nose-up pitch of the frame 102 can also result in a portion of the side plates (e.g. see FIG. 1) lifting off of the ground, which will interfere with the side plates' role in providing a ground reference. Finally, a frame 102 that is at a pitch (nose-up or nose-down) can result in an uncomfortable experience for the operator of the milling machine 400. As such, even for milling machines that would avoid a gouge 450 during a plunge into a depression, the present inclination control system would be beneficial to maintain the frame 102 parallel to the cut plane 404 at least to allow for maximum range of adjustment of the front lifting cylinders, to provide a more comfortable experience for the operator, to avoid a gouge cut 450, and to avoid lifting a portion of the side plates off of the ground.

The lifting columns 108 are coupled to the frame 102 at a fixed angle 416, 418 (in the illustrated example, 90 degrees), but are pivotably coupled to the transportation devices 106. As such, when the rear transportation devices 106 move from the hardened surface 122 to the depressed operating surface 402, the lifting columns 108 pivot relative to the transportation devices 106, to a first angle 420, 422 (depicted using axes 412, 414 of the lifting columns 108 and axes 408, 410 of the transportation devices 106). The inclination control system 401 uses the sensor 142 to detect the angle 420 between the lifting column 108 and the transportation device 106. In the illustrated example, a sensor 142 is shown on a rear transportation device 106. In some example each rear transportation device 106 includes a sensor 142. In some examples each transportation device 106 includes a sensor 142. In some examples, one or more front transportation devices could include a sensor 142. In at least one example, only a rear transportation device 106 includes the sensor 142. The sensor 142 senses information related to the orientation of the transportation device 106 relative to the lifting column 108 and therefore the machine frame 102. In the illustrated example, based on the sensed information from the sensor 142, the controller 150 determines that the angle 420 exceeds a threshold value. For example, the controller could use a threshold value of 90 degrees, a range such as 88 degrees to 92 degrees, an offset threshold value such as 92 degrees or 88 degrees, or the like. In the illustrated example, the controller 150 uses a threshold value of 90 degrees, and determines that the angle 420 is greater than 90 degrees and therefore the frame axis 116 is not parallel to the cut plane 402 and the front of the milling machine 400 is pitched up (nose-up). If instead the controller 150 determined that the angle 420 was less than 90 degrees, then the controller 150 could determine that the frame axis 116 is not parallel to the cut plane 402 and that the front of the milling machine 400 is pitched down (nose-down).

The controller 150 can extend or retract the rear lifting columns 108 to correct the angle 420. For example, the controller 150 can extend the rear lifting columns 108 if the front of the machine 400 is pitched up and lower the lifting columns 108 if the front of the machine 400 is pitched down. In other examples, the controller 150 could extend or retract one or more of the front lifting columns 108 instead of or in addition to the rear lifting columns 108. In some examples, the controller 150 can adjust one or more lifting columns 108 that do not correspond to a transportation device 106 that includes a sensor 142. For example, the sensor 142 could be on a right rear transportation device 106, but the controller 150 could retract the front lifting columns 108 to change the angle of the right rear transportation device. In some examples, the controller 150 can extend or retract one or more lifting columns 108 associated with a transportation device 106 that does not include a sensor 142 in addition to one or more lifting column 108 associated with a transportation device 106 that does include a sensor 142. In some examples, the milling machine 400 can include four transportation devices 106, for example right rear, left rear, right front, left front. In other examples, the milling machine 400 can include three transportation devices 106, for example rear, right front, left front.

In at least one example, the inclination system checks the angle 420 as the controller 150 adjusts the lifting column 108 so it knows when to stop the lifting column 108 based on the angle 420 reaching the threshold. In some examples, the inclination system 401 continuously checks the angle 420 and the controller 150 corrects the angle 420 in real time. In at least one example, the controller 150 can determine the precise adjustment required based on the actual value of the angle 420 (rather than merely determining that the angle 420 exceeds a threshold).

Figure 5:
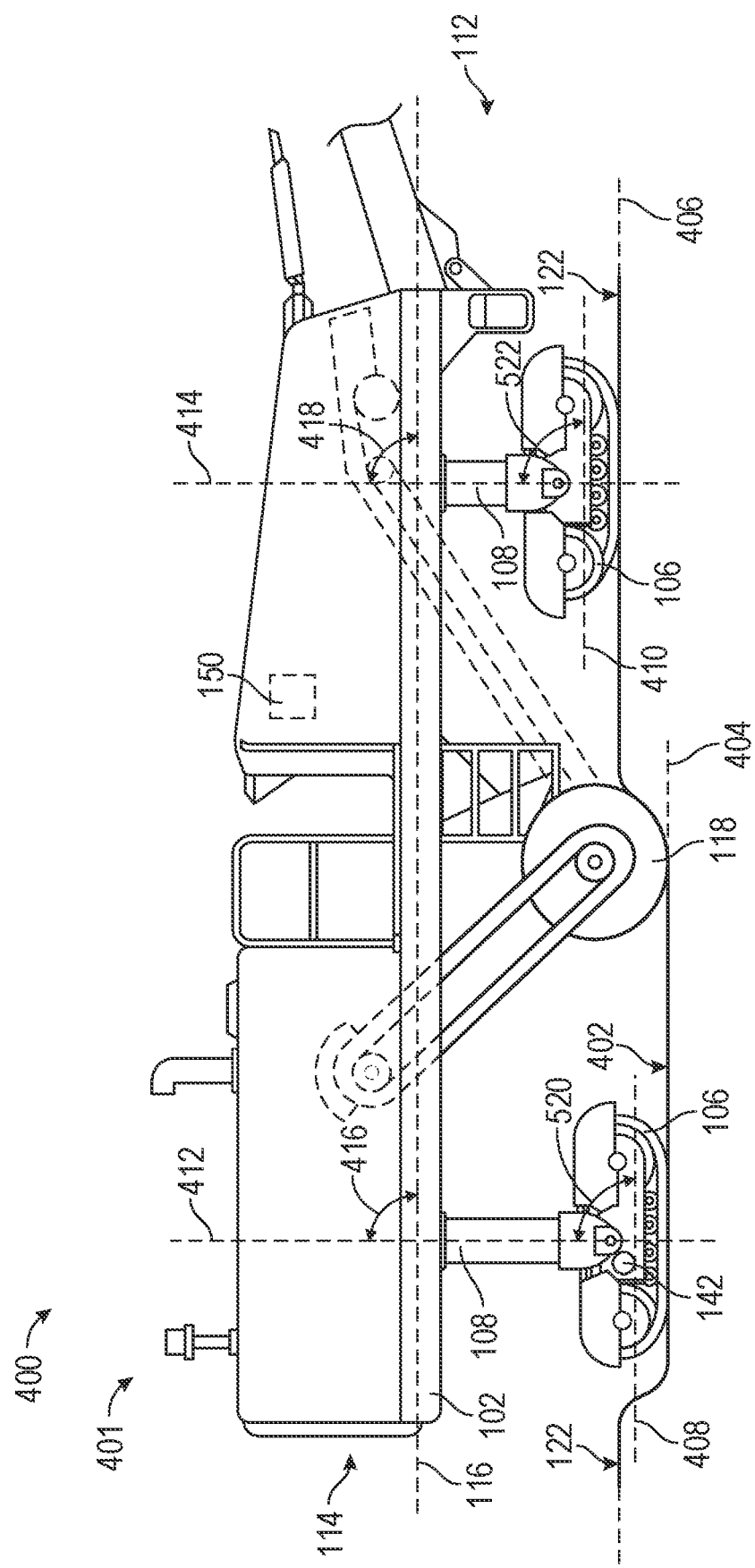
FIG. 5 is a side view of the construction machine of FIG. 4 after the inclination control system has been used to correct inclination, in accordance with at least one example.

FIG. 5 is a side view of the construction machine 400 of FIG. 4 after the inclination control system 401 has been used to correct inclination of the frame 102, in accordance with at least one example. The controller 150 has extended the rear lifting columns 108 in a longitudinal direction (along the longitudinal axis of each rear lifting column 108, e.g., axis 412) such that the orientation of the transportation devices 106 has changed relative to the lifting columns 108 and the frame 102. Specifically, the controller 150 has extended the rear lifting columns 108 to change the first angle 420, 422 of the transportation devices 106 to a second angle 520, 522, which results in the correct orientation of the frame 102. In the illustrated example, the second angle following the adjustment is 90 degrees, such that the frame 102 is parallel to the operating surface 402 and the cut plane 404 and the milling drum 118 is cutting at the appropriate depth and angle even though the transportation devices remain at different depths or heights. The inclination control system collects information about the second angle 520 of the rear transportation device 106 and the controller 150 determines that the second angle 520 indicates that the frame 102 of the milling machine 400 is at a correct orientation relative to the cut plane 404. In at least one example, the inclination control system 401 makes adjustments in real time such that it is able to maintain the frame 102 at the correct orientation.

While the side views of FIGS. 4 and 5 only show one rear transportation device 106, one rear lifting column 108, and one sensor 142, in at least one example the milling machine includes a second rear transportation device, a second rear lifting column, and a second sensor. In some examples, the controller 150 uses an average of the angles sensed by the first and second sensors associated with the first and second transportation devices and the first and second lifting columns to determine how to adjust the rear lifting columns to achieve a correct orientation of the frame 102 of the milling machine 400 relative to the cut plane 104

Figure 6:
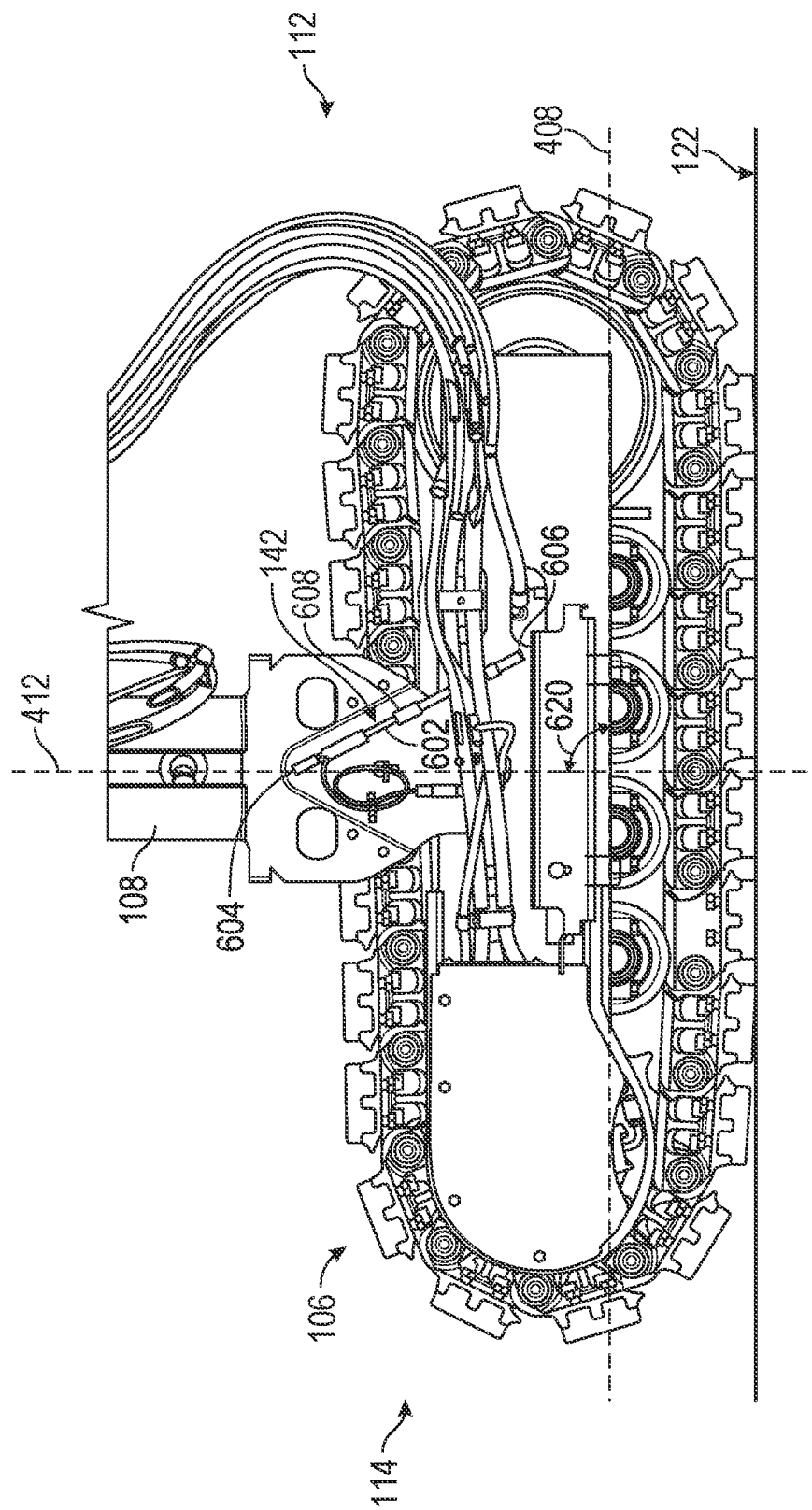
FIG. 6 is a side view of a right rear transportation device including a sensor of an inclination control system, in accordance with at least one example.

FIG. 6 is a side view of a left rear transportation device 106 including a sensor 142 of an inclination control system, in accordance with at least one example. The sensor 142 (e.g., slope sensor or angle sensor) can be a linear sensor, a single-axis sensor, a telescoping sensor, a magnetoresistive sensor, a combination of these, or the like. In the illustrated example, the sensor 142 is a magnetoresistive linear sensor including a telescoping hollow rod 602 housing one or more circuit boards, and one or more magnets 608 slidably coupled to the rod 602. The sensor 142 is coupled at one end 604 to the lifting column 108 and at a second end 606 to the transportation device 106, such that the sensor extends along its longitudinal axis between the lifting column 108 and the transportation device 106. As the lifting column 108 tilts relative to the transportation device 106, the magnet 608 slides on the rod 602 such that the position of the magnet 608 corresponds to the angle 620 between the axis 512 of the lifting column 108 and the axis 408 of the transportation device 106. Other examples may include more or less sensors, different sensors, sensors which are differently oriented or fixed in different locations, and may detect a different angle of the lifting column 108 relative to the transportation device 106.

INDUSTRIAL APPLICABILITY

The present application describes various systems and methods for controlling inclination of a construction machine relative to an operating surface, for example, to control a cold planer machine to keep its frame parallel to the cut plane. One or more angle sensors can be used as part of an inclination control system to identify tilting of the construction machine (e.g., forward-aftward). In at least one example, two or more single-axis sensors are positioned on the rear transportation devices of the construction machine, such that they indicate an angle between the lifting column and the transportation device. Since the angle between the lifting column and the frame of the construction machine is fixed, a change in the angle between the lifting column and the transportation device indicates tilting of the frame of the construction machine, and the lifting columns can be adjusted to correct for the tilting. In some examples the inclination control system detects the angle of the transportation device relative to the lifting column continuously in real time and adjusts one or more lifting columns in real time to minimize inclination of the construction machine or to maintain an orientation of the frame of the milling machine relative to a cut plane. Optimization of the control of inclination relative to the operating surface results in better overall performance of the construction machine, including ride stability and level cutting.

What is claimed is:

1. A construction vehicle, comprising
  a frame defining a front and rear of a milling machine;
  a milling drum carried by the frame, the milling drum surrounded by a milling enclosure;
  a front left transportation device configured to move the milling machine over a ground surface;
  a front left longitudinally adjustable lifting column extending between the frame and the front left transportation device;
  a front right transportation device configured to move the milling machine over the ground surface;
  a front right longitudinally adjustable lifting column extending between the frame and the front right transportation device;
  at least one rear transportation device configured to move the milling machine over the ground surface;
  at least one rear longitudinally adjustable lifting column extending between the frame and the at least one rear transportation device;

a controller configured to control movement of one or more of the lifting columns along its longitudinal axis to change a distance between the frame and one or more of the transportation devices;
an inclination control system, including a first sensor associated with a first transportation device of the transportation devices, such that the first sensor is configured to detect an angle of the first transportation device relative to the frame, and a second sensor associated with a second transportation device and its corresponding lifting column, wherein the first sensor and the second sensor are magnetoresistive linear sensors, and a frame slope sensor mounted to the frame of the device;
wherein the controller is configured to:
determine, based on sensed information received from the first sensor, an inclination of the frame of the milling machine relative to the ground surface supporting the first transportation device;
use an average of the angle sensed by the first sensor and an angle sensed by the second sensor to determine the inclination of the frame of the milling machine relative to the ground surface;
determine inclination of the frame based on the average of the angle sensed by the first sensor and the angle sensed by the second sensor and further based on an angle sensed by the frame slope sensor; and
control one or more of the lifting columns to maintain the frame of the milling machine at an angle relative to the operating surface based on a comparison between the average and the angle sensed by the frame slope sensor.

2. The construction vehicle of claim 1, wherein the first sensor is coupled to the first transportation device and its corresponding lifting column.

3. The construction vehicle of claim 2, wherein the first sensor extends along its longitudinal axis between the first transportation device and its corresponding lifting column.

4. The construction vehicle of claim 1, wherein:
the at least one rear transportation device includes a rear left transportation device and a rear right transportation device;
the at least one rear lifting column includes a rear left lifting column associated with the rear left transportation device and a rear right lifting column associated with the rear right transportation device; and
the first and second transportation devices are rear transportation devices.

5. The construction vehicle of claim 1, wherein the lifting columns are coupled to the frame at a fixed angle.

6. A system, comprising:
a milling machine including:
a frame extending from a rear of the milling machine to a front of the milling machine;
a milling drum supported by the frame, the milling drum configured to cut hardened materials to create a milled surface;
a plurality of transportation devices, including first and second rear transportation devices, the plurality of transportation devices configured to transport the milling machine;
a first rear lifting column extending from the first rear transportation device and configured to be extended or retracted to change an orientation of the first rear transportation device relative to the frame; and
a second rear lifting column extending from the second rear transportation device and configured to be extended or retracted to change an orientation of the second rear transportation device relative to the frame; and
an inclination control system, including:
a first angle sensor coupled to the first rear transportation device and configured to provide orientation information related to the first rear transportation device;
a second angle sensor coupled to the second rear transportation device and configured to provide orientation information related to the second rear transportation device, wherein the first and second angle sensors are magnetoresistive linear sensors;
a frame slope sensor mounted to the frame; and
a controller configured to extend or retract the first and second rear lifting columns based on an average of the orientation information received from the first and second angle sensors and further based on a comparison between the average and the angle sensed by the frame slope sensor to achieve a predetermined orientation of the first and second rear transportation devices to maintain an orientation of the frame of the milling machine relative to a cut plane.

7. The system of claim 6, wherein:
the orientation information related to the first rear transportation device is a first angle between the first rear transportation device and its lifting column; and
the orientation information related to the second rear transportation device is a first angle between the second rear transportation device and its lifting column.

8. The system of claim 6, wherein the predetermined orientation is an angle of 90 degrees between each transportation device and its lifting column.

9. A method for controlling inclination of a milling machine, comprising:
moving the milling machine over a ground surface;
collecting, at an inclination control system including a first angle sensor coupled to a first rear transportation device and a second angle sensor coupled to a second rear transportation device, wherein the first and second angle sensors are magnetoresistive linear sensors, a first angle of the first rear transportation device and a first angle of the second rear transportation device;
collecting a frame slope of the milling machine using a frame slope sensor;
calculating, at a controller of the inclination control system, an average of the first angle of the first rear transportation device and the first angle of the second rear transportation device;
determining, at the controller, that the first angle indicates that a frame of the milling machine is at an incorrect orientation relative to a cut plane, wherein the determining includes a determination that the average exceeds a threshold angle and the determining further includes performing a comparison between the average and the angle sensed by the frame slope sensor;
extending or retracting, via the controller, a lifting column of the first rear transportation device to change the first angle of the first rear transportation device to a second angle;
collecting, at the inclination control system, information about the second angle of the first rear transportation device; and
determining, at the controller, that the second angle of the first rear transportation device indicates that the frame of the milling machine is at a correct orientation relative to the cut plane.

10. The method of claim 9, wherein the correct orientation of the frame is parallel to the cut plane and the incorrect orientation of the frame is nonparallel to the cut plane.

11. The method of claim 9, wherein the first and second angles of the first rear transportation device are angles formed between the first rear transportation device and its lifting column.

12. The method of claim 9, wherein the inclination control system is configured to adjust angles of the first rear transportation device in real time to maintain the frame in the correct orientation.

13. The method of claim 9, further comprising:
  extending or retracting, via the controller, a lifting column of a second rear transportation device to change the first angle of the first rear transportation device to the second angle.

14. The method of claim 9, wherein:
  moving the milling machine over a ground surface includes moving the first rear transportation device into a depression created by the milling drum, creating the first angle between the first rear transportation device and its lifting column;
  the incorrect orientation of the frame includes a front of the milling machine being pitched up; and
  the controller extends the lifting column of the first rear transportation device to change the first angle to the second angle and correct the orientation of the frame.

\* \* \* \* \*